(12) United States Patent
Hensley et al.

(10) Patent No.: US 6,711,830 B2
(45) Date of Patent: Mar. 30, 2004

(54) CUTTINGS TREATMENT SYSTEM

(76) Inventors: Gary L. Hensley, 3315 Little Bear Dr., Kingwood, TX (US) 77339; Lee Hilpert, P.O. Box 12, Leggett, TX (US) 77350

( * ) Notice: Subject to any disclaimer, the term of this patent is extended or adjusted under 35 U.S.C. 154(b) by 0 days.

(21) Appl. No.: 10/213,033

(22) Filed: Aug. 6, 2002

(65) Prior Publication Data

US 2003/0159310 A1 Aug. 28, 2003

Related U.S. Application Data

(60) Provisional application No. 60/359,384, filed on Feb. 25, 2002.

(51) Int. Cl.$^7$ .................................................. F26B 3/00
(52) U.S. Cl. ............................. 34/357; 34/580; 34/591; 210/360.1; 210/380.1
(58) Field of Search ........................ 34/576, 579, 580, 34/582, 585–587, 591, 592, 147; 210/87, 97, 103, 104, 398, 408, 360.1, 380.1, 380.3, 295

(56) References Cited

U.S. PATENT DOCUMENTS

| | | | |
|---|---|---|---|
| 3,938,434 A | * | 2/1976 | Cox ............................ 100/117 |
| 4,599,117 A | | 7/1986 | Luxemburg |
| 5,132,025 A | * | 7/1992 | Hays .......................... 210/758 |
| 5,207,532 A | | 5/1993 | Mason et al. |
| 5,213,625 A | * | 5/1993 | Van Slyke .................... 134/26 |
| 5,234,577 A | | 8/1993 | Van Slyke |
| 5,344,570 A | | 9/1994 | McLachlan et al. |
| 5,472,620 A | | 12/1995 | Huang |
| 5,634,984 A | | 6/1997 | Van Slyke |
| 5,707,673 A | * | 1/1998 | Prevost et al. ............... 426/417 |
| 5,788,781 A | | 8/1998 | Van Slyke |
| 5,882,524 A | | 3/1999 | Storey et al. |
| 5,968,370 A | | 10/1999 | Trim |
| 6,036,870 A | | 3/2000 | Briant et al. |
| 6,165,946 A | | 12/2000 | Mueller et al. |
| 6,214,236 B1 | | 4/2001 | Scalliet |
| 6,276,306 B1 | | 8/2001 | Murphy et al. |
| 6,375,841 B1 | * | 4/2002 | Nemedi et al. ............. 210/298 |
| 6,432,299 B1 | * | 8/2002 | Hensley et al. ............... 210/87 |

* cited by examiner

*Primary Examiner*—Henry Bennett
*Assistant Examiner*—Camtu Nguyen
(74) *Attorney, Agent, or Firm*—Law Office of Tim Cook P.C.

(57) ABSTRACT

A method of treating drill cuttings containing a detectable amount of hydrocarbon-based drilling fluid comprises injecting a non-toxic additive to the cuttings and mixing the cuttings and additive to the point where the amount of hydrocarbon-based drilling fluid is less than 1% by weight. The method of treating cuttings includes the additional step of taking the mixture of cuttings and additive and disposing of the mixture directly to the soil, preferably in the immediate vicinity of the well site. A system is provided for carrying out the method, including structure for adding a quantity of an chemical additive to cuttings carrying a quantity of drilling fluid. The system further provides a controller to determine the cuttings load within the system, and controls to vary the quantity of treatment chemicals added to the cuttings according to the cuttings load.

10 Claims, 2 Drawing Sheets

CUTTINGS TREATMENT SYSTEM

This application claims the benefit of U.S. Provisional Application Ser. No. 60/359,384 filed Feb. 25, 2002.

FIELD OF THE INVENTION

The present invention relates generally to the field of treating cuttings which are a bi-product of the well drilling process, and, more particularly, to the field of remediation of cuttings from such a process to eliminate the need for toxic waste disposal treatment of cuttings.

BACKGROUND OF THE INVENTION

The oil and gas well drilling process involves the use of drilling fluid known in the field as drilling mud. Drilling mud formulation technology is very advanced, often including the addition to the water or oil base of heavy additives which are more expensive than the oil that is ultimately produced. For this reason, the recovery and recycling of the expensive drilling fluid is critical to the economic success of the drilling process.

The steps of recovering and recycling drill mud includes the separation of the drilling mud from the cuttings produced in drilling the well. For example, shale shakers have been used for years as a first step in removing the largest cuttings from the drilling mud. In recent years, centrifuge systems having a number of stages have proven to be very effective in removing the drilling fluid from the cuttings, to the point that governmental regulations require that in certain environments the drilling mud, based primarily on a synthetic oil product for off-shore drilling operations, constitute less than 6.9% of the discharge from the drilling process. And systems have been developed to meet and even exceed this requirement. For on-shore drilling operations, drilling fluid is typically diesel oil based and thus toxic to the environment, and a different set of disposal regulations applies.

Different regulations apply to land-based drilling operations because of the different environment from that of off-shore operations. For land-based operations, the residue of the drilling process is commonly gathered and transported to disposal sites. Disposal at such sites often involves placing the residue in underground repositories because the residue is itself toxic. The transportation of the waste is expensive and is meeting increasing resistence from the public. However, certain regulations such as those in Texas dictate that if drilling fluids remain on the cuttings at less than 1% by weight, then the cuttings do not have to be disposed of at a toxic waste site.

Thus, there remains a need for a way to dispose of the waste from land-based drilling operations that eliminates the need to transport and bury the waste. The present invention is directed to fulfilling this need in the art in which such volatile materials must be removed from granular solids by the reclamation of petroleum lubricated drilling fluids used in the exploration and production of petroleum oils. While drilling mud is essentially a diesel or synthetic material based fluid composition, the drilling mud is frequently compounded with a lubricant material such as diesel, crude oil, or other non-water petroleum based constituent to facilitate the mud's lubricating characteristics. These lubricant materials present a biohazard, and the present invention is directed to minimizing or eliminated this biohazard on land-based drilling operations.

SUMMARY OF THE INVENTION

The present invention is directed to the treatment of cuttings from the drilling process to the point that the cuttings need not be disposed of as toxic waste, but can be disposed of directly at the drill site by land farming. Current cuttings dryers from Hutchison-Hayes International, the Assignee of the present innovation, reduce the oil content of drill cuttings to between 2% and 3%. This low level of oil content is still too high to disposed of the cuttings directly to the environment, but treatment of the cuttings either upstream or downstream of the cuttings dryer by a chemical additive reduces the oil content still further. The oil content of the cuttings can effectively be reduced to below 1% within the cuttings dryer itself, permitting the cuttings to be spread over the surrounding area around the drill site, much as fertilizer is spread on the land.

Although other additives may be used to good effective, presently preferred additive is Diethylene Glycol Monoethyl Ether ($HOCH_2CH_2OCH_2CH_2OC_2H_5$), sold under the tradename Carbitol. Whatever additive is used, it must have certain physical and chemical characteristics. The additives which find application in the present invention are primarily solvents, surfactants, demulsifiers, and dispersants, or blends of these products. Other additives may include enzymes, saponifiers, and certain biological agents including micro-organisms. The additive must react quickly with the drilling mud residue on the cuttings and break down the oil of the drilling mud to a non-toxic reaction product. Further, the additive itself must be non-toxic to permit the immediate disposal of the final stage cuttings directly to the soil. Further, if the additive is added to the fluids-laden cuttings upstream of the cuttings dryer, the additive must not adversely alter the makeup of the drilling fluid so that the fluids discharge from the cuttings dryer can be directed back to the drilling mud system for reuse.

Thus, the present invention comprises injecting an additive to cuttings containing a detectable amount of hydrocarbon-based drilling fluid and mixing the cuttings and additive to the point where the amount of hydrocarbon-based drilling fluid is less than 1% by weight. The present invention also includes the additional step of taking the mixture of cuttings and additive and disposing of the mixture directly to the soil, preferably in the immediate vicinity of the well site.

The additive may be mixed with the oil-bearing cuttings either upstream or downstream of the cuttings dryer. For effective mixing, the cuttings are preferably placed in a mixing component, such as for example an auger or the like, and exposed to a fine spray of the additive. The mixing component may thus be placed upstream of the cuttings dryer, and the additive/cuttings mixture then directed to the cuttings dryer. Alternatively, the mixing component is preferably placed downstream of the cuttings dryer where the oil content of the cuttings is substantially reduced from that of the upstream side of the cuttings dryer. However, the structure of the mixing component is the same or similar to that previously described.

The present invention further provides the feature of varying the rate of the additional of the chemical additive based on the rate at which cuttings are input into the system. The system senses the load, i.e. the cuttings loading, and alters the operation of the cuttings dryer accordingly, and simultaneously in a coordinated fashion increases or decreases the rate of additional of the treatment chemical.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, maybe had by reference to embodiments thereof which are illustrated in the appended drawings.

DETAILED DESCRIPTION OF A PREFERRED EMBODIMENT

Figure 1:
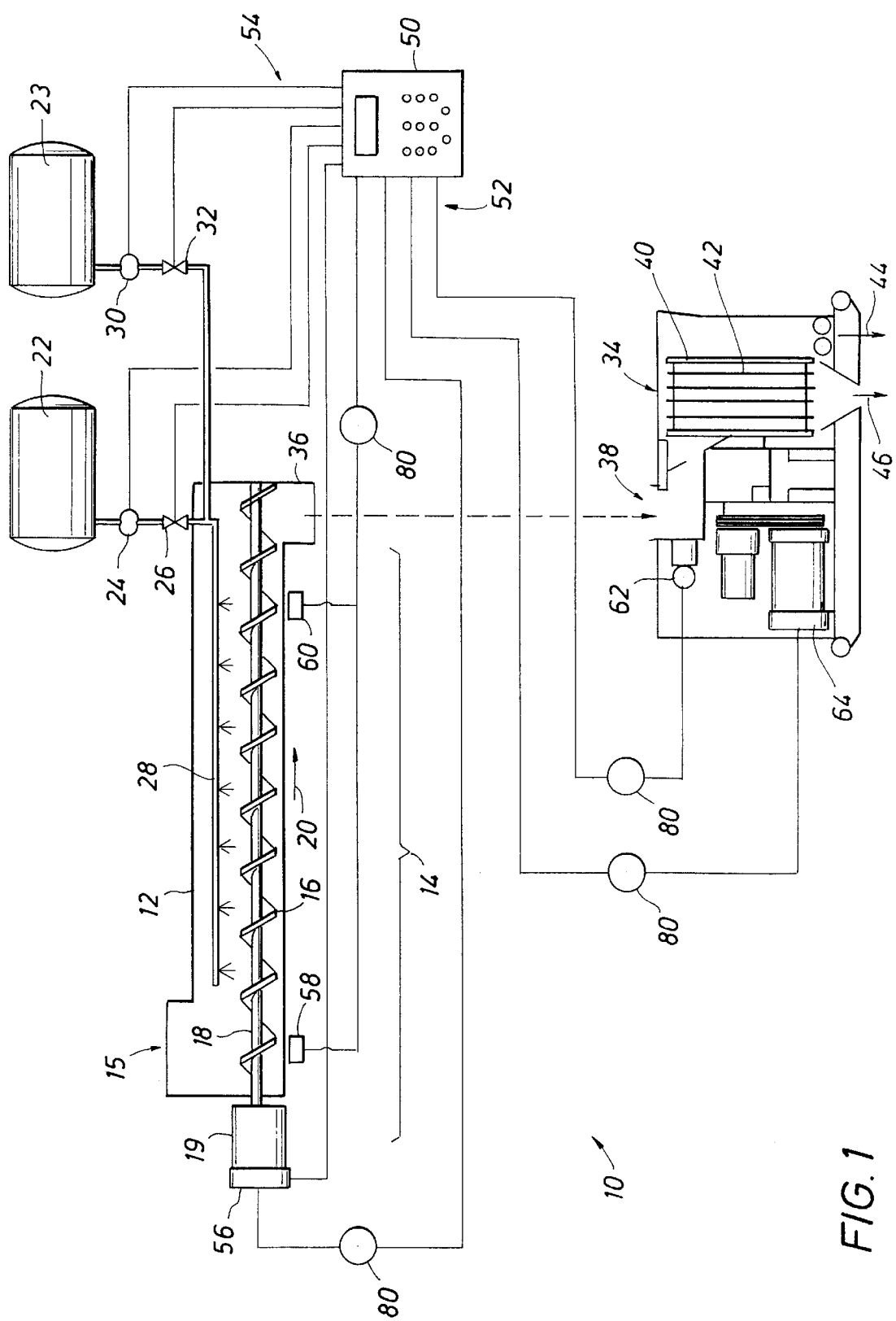
FIG. 1 is a schematic diagram of the present invention wherein the additive is added to the cuttings upstream of a cuttings dryer.

FIG. 1 depicts a cuttings treatment system 10 of the invention comprising a supply line 12 carrying previously-treated cuttings laden with a residue of hydrocarbon-based drilling fluid, typically at a bout 20% by weight of drilling fluid. The cuttings enter a transport section or component 14 at a feed inlet 15. The transport section preferably comprises an auger 16 driven on a shaft or axis 18 by an auger drive motor 19, but may also comprise other means to convey the fluid-laden cuttings from an earlier treatment stage (not shown). For example, the transport system may comprise an appropriate vacuum conduit to move the cuttings by differential, or an equivalent-type transport.

The cuttings are transported to the right as seen in FIG. 1 and as shown by an arrow 20. While in the transport section 14, the cuttings are mixed with an additive from a supply tank 22 or supply tank 23, or from a mixture from both tanks 22 and 23. The supply tank 22 gravity feeds a treatment additive to the suction of a pump 24 which discharges through a metering valve 26 to pressurize a sprayer 28. Similarly, the supply tank 23 is provided with a pump 30 and metering valve 32 to provide treatment additive to the sprayer 28. An effective amount of the additive is thereby added to the cuttings to remediate the drilling fluid oil carried with the cuttings so that after passing through a cuttings dryer 34 the solids discharge comprises less than 1% by weight of drilling fluid. The tanks 22 and 23 may contain the same or different treatment additives, depending on the needs of the application for the treatment of drill cuttings.

In the embodiment of FIG. 1, the cuttings fed to the system 10 are treated with a treatment additive prior to entering the cuttings dryer 34. The cuttings, having been sprayed with the treatment additive, gravity feed from an outlet 36 of the transport section 14 into an inlet 38 of the cuttings dryer 34. The cuttings dryer depicted in FIG. 1 is preferred, and is described in greater detail in our co-pending application Ser. No. 09/620,844, filed Jul. 21, 2000, titled Cuttings Dryer For Removing Liquid From A Slurry, the contents of which is incorporated herein by reference. The cuttings dryer preferably includes a horizontally driven cylindrical basket 40 with a scroll conveyor 42 inside the basket 40. The cuttings dryer 34 includes a solids discharge 44 and a fluids discharge 46, with the solids discharge now having almost no drilling fluid remaining thereon so that it can be land farmed in the area of the drilling operations. The fluids discharge is directed back to the drilling mud system for reuse.

The system 10 of FIG. 1 also includes a controller 50 to control the application of the treatment additive. The controller 50 includes a plurality of inputs 52 and a plurality of outputs 54. The inputs 52 include signals from various sensors within the system 10 and the outputs comprise control signals to various functional components within the system. One such input is a sensor signal relating to the current drawn by the auger motor 19 as sensed by a mounted current sensor on a motor controller 56. This current signal directly relates to the load on the motor, and thus the quantity of cuttings being conveyed in the transport section 14 by the auger. The quantity of cuttings being conveyed in the transport section is also measured by a forward load sensor 58 and by an after load sensor 60. The sensors 58 and 60 measure the weights of their respective ends of the cuttings supply line 12 and provide this measurement to the controller 50. The controller 50 also receives a torque signal input from a torque sensor 62 on the conveyor drive of the cuttings dryer 34, and a current signal input from a current sensor 64 on the main prime mover of the cuttings dryer 34. These signals together relate directly to the cuttings load within the cuttings dryer.

Using the inputs just described, the controller 50 determines the quantity of cuttings being processed by the system 10 of the present invention, and from this calculation determines the quantity of treatment additive required to effectively neutralize the drilling fluid carried by the cuttings. In response, the controller 50 outputs a plurality of control signals at the outputs 54. One of the outputs 54 provides a speed control signal to the motor controller 56 of the auger motor 19, so that as the cuttings load entering the inlet 15 increases, the speed of the auger motor also increases to accommodate the load. Also, one pair of outputs 54 are directed to the pump 24 and the valve 26 to respond to variations in the cuttings load, so that more or less of the treatment additive is drawn from the tank 22. The other pair of outputs 54 are similarly directed to the pump 30 and the metering valve 32 to draw more or less of the treatment additive from the tank 23.

It should also be noted at this point that the speed of the auger is not simply a matter of moving fast enough to keep up with the rate of cuttings entering the system. The auger also absorbs the variations in the rate of feed into the inlet 15, and also operates at a speed that is slow enough to provide adequate "residence time", i.e. time enough within the transport section 14 for the cuttings to be adequately treated by the treatment additive. Thus, the speed of the auger motor 19 varies up and down to provide this feature of the present invention. Finally, the system further provides a plurality of meters 80 to monitor the performance of the system.

Figure 2:
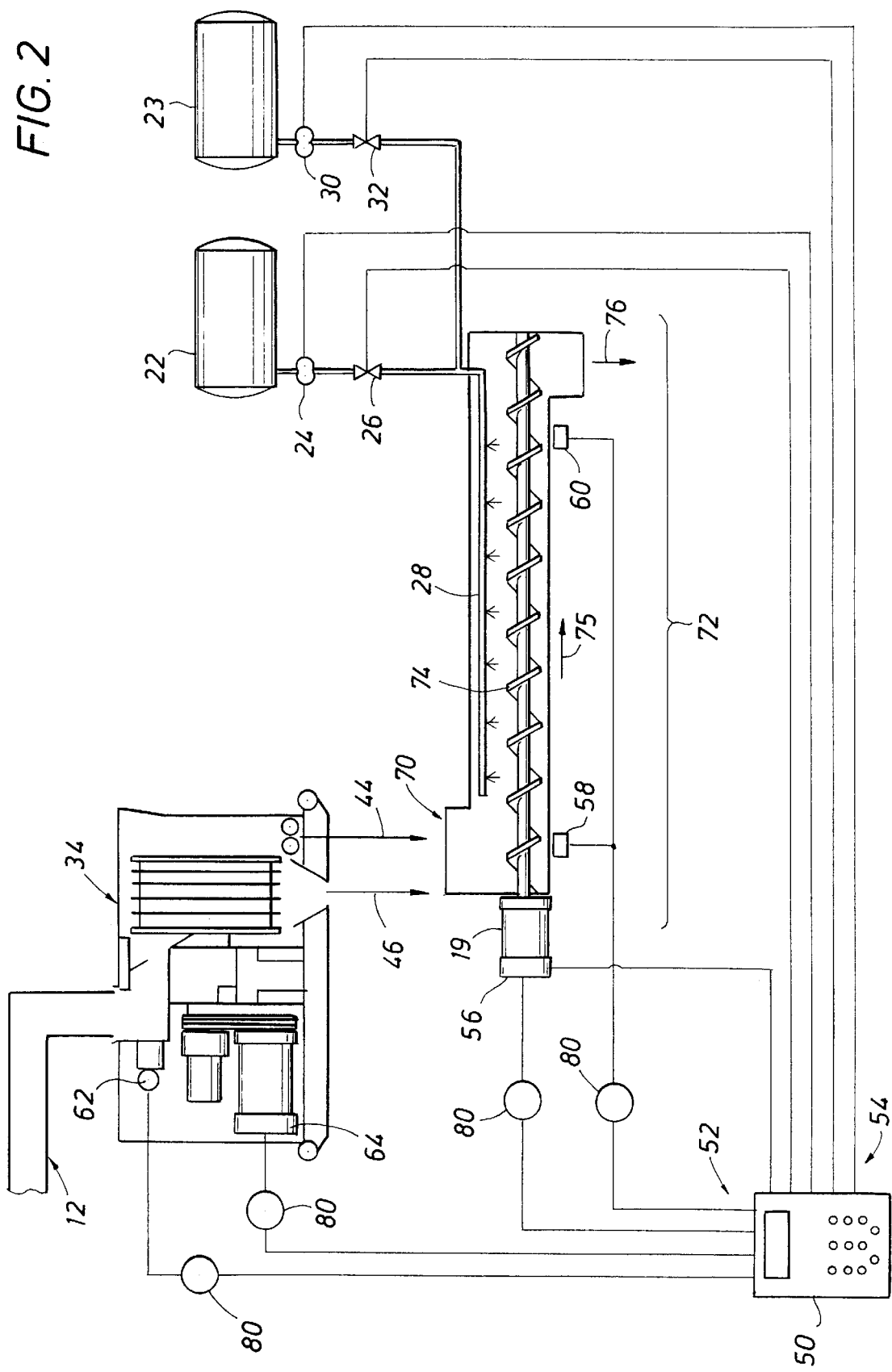
FIG. 2 is a schematic diagram of the present invention wherein the additive is added to the cuttings downstream of the cuttings dryer.

FIG. 2 depicts a presently preferred embodiment of the invention which still includes the cuttings supply line 12, but in this embodiment the cuttings supply line comprises a feed stream which is directed to the inlet of the cuttings dryer 34. At this point, the fluids content of the cuttings is typically 20% by weight, as before. The cuttings dryer reduces the fluids content to approximately 2% to 3% by weight, and the fluids removed by the cuttings dryer are directed to the fluids discharge 46 for return to the drilling mud system. The solids discharge 44 is directed into an inlet 70 of a transport section 72 which primarily comprises an auger 74. The cuttings within the transport section 72 are moved to the right as seen in FIG. 2 and as shown by an arrow 75. As before, the system includes supply tanks 22 and 23 which provide the chemical additives to an elongated sprayer 28 to treat the fluids on the cuttings.

In the case of the embodiment of FIG. 2, much less of the chemical additive is required to remediate the hydrocarbon on the cuttings, since the cuttings to be treated have been through the cuttings dryer 34. The embodiment of FIG. 2 provides an additional advantage over that shown in FIG. 1 in that the cuttings and additive mixture, discharged from a discharge 76, contain more (non-toxic) fluid content and are more easily transported from the discharge 76 to a point in the immediate vicinity for land farming.

As with the embodiment previously described in respect of FIG. 1, the embodiment depicted in FIG. 2 provides a controller 50 to receive sensor inputs at a plurality of inputs 52 and to develop control signals at a plurality of outputs 54. The function and operation of the controller is in all respects the same as the controller 50 previously described. In this embodiment, however, the cuttings dryer 34 helps to smooth out the variations in cuttings load from the feed stream, and thus the cuttings entering the transport section 72 tends to have a steadier input rate of cuttings, making the job much easier for the controller 50 to accommodate the cuttings load and properly meter out the desired quantity of treatment chemicals.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A cuttings treatment system comprising:
   a. a transport system comprising a variable speed auger within a housing defining an outlet port, the augur extending over at least part way over the outlet port and adapted to carry cuttings and to mix the cuttings with a chemical additive, the transport system further having a sprayer within the housing;
   b. a cuttings dryer adapted to receive the mixture of cuttings and additive from the outlet port of the transport system and to reduce the fluids content of the cuttings; and
   c. a discharge to carry the cuttings with reduced fluids from the cuttings dryer.

2. The system of claim 1, wherein the additive is selective from the group consisting of solvents, surfactants, demulsifiers, dispersants, enzymes, saponifiers, and certain biological agents including micro-organisms or blends of these products.

3. The system of claim 1, further comprising at least one storage tank coupled to the sprayer and adapted to retain a quantity of the chemical additive.

4. The system of claim 3, further comprising a controller to vary the speed of the auger and to vary the rate of mixing the cuttings with the chemical additive.

5. The system of claim 1 further comprising a control system varying the operation of the sprayer in response to quantity of cuttings with the transport system.

6. A cuttings treatment system comprising:
   a. a cuttings dryer adapted to receive cuttings and to reduce the fluids content of the cuttings;
   b. a transport system comprising a variable speed augur within a housing having an outlet port, the augur extending at least part way over the outlet port and adapted to receive cuttings from the cuttings dryer and to mix the cuttings with a chemical additive, the transport system further comprising a sprayer within the housing; and
   c. a discharge to discharge the mixture of cuttings and additive.

7. The method of claim 6, wherein the additive is selective from the group consisting of solvents, surfactants, demulsifiers, dispersants, enzymes, saponifiers, and certain biological agents including micro-organisms or blends of these products.

8. The system of claim 6, further comprising at least one storage tank coupled to the sprayer and adapted to retain a quantity of the chemical additive.

9. The system of claim 8, further comprising a controller to vary the speed of the auger and to vary the rate of mixing the cuttings with the chemical additive.

10. The system of claim 6 further comprising a control system varying the operation of the sprayer in response to quantity of cuttings with the transport system.

* * * * *